(12) United States Patent
Teng et al.

(10) Patent No.: US 7,525,984 B2
(45) Date of Patent: Apr. 28, 2009

(54) METHOD AND APPARATUS FOR UNIFYING MAC PROTOCOLS

(75) Inventors: Chao-Ming Teng, Hsinchu (TW); Kwang-Cheng Chen, Hsinchu (TW)

(73) Assignee: MediaTek Inc. (TW)

( * ) Notice: Subject to any disclaimer, the term of this patent is extended or adjusted under 35 U.S.C. 154(b) by 1202 days.

(21) Appl. No.: 10/624,549

(22) Filed: Jul. 23, 2003

(65) Prior Publication Data

US 2005/0044249 A1 Feb. 24, 2005

(51) Int. Cl.
*H04L 12/413* (2006.01)
(52) U.S. Cl. .......................... 370/445; 370/465; 370/469
(58) Field of Classification Search .................. None
See application file for complete search history.

(56) References Cited

U.S. PATENT DOCUMENTS 5,373,503 A * 12/1994 Chen ........................... 370/346

2002/0080728 A1 * 6/2002 Sugar et al. .................. 370/252
2004/0196857 A1 * 10/2004 Holloway et al. ............ 370/401

* cited by examiner

*Primary Examiner*—Bob A Phunkulh
(74) *Attorney, Agent, or Firm*—Browdy and Neimark, P.L.L.C.

(57) ABSTRACT

A method and apparatus for unifying medium access control (MAC) protocols that can unify the various existed MAC protocols, e.g. slotted ALOHA protocol, carrier sense multiple access (CSMA) protocol, group randomly addressed polling (GRAP) protocol and so forth. The method comprises: grouping the MAC nodes having a ready packet according to preset parameters; and transmitting packets according to the grouping result and the preset parameters. The apparatus comprises a unified MAC processor, a memory and a transmitter/receiver circuit. Therein, the memory further comprises a unified MAC program and a packet buffer and the unified MAC program is used to control the unified MAC processor. After configuring the unified MAC program, the unified MAC processor will operate as the specific MAC protocol. Therefore, the apparatus can transmit its packet via the transmitter/receiver circuit thereon in accordance with the specific MAC protocol.

27 Claims, 10 Drawing Sheets

METHOD AND APPARATUS FOR UNIFYING MAC PROTOCOLS

FIELD OF THE INVENTION

The present invention is directed to a method and apparatus for unifying medium access control (MAC) protocols, and more particularly, to a method and apparatus that can unify the various existed MAC protocols, e.g. slotted ALOHA protocol, carrier sense multiple access (CSMA) protocol, group randomly addressed polling (GRAP) protocol and so forth.

BACKGROUND OF THE INVENTION

In the conventional computer/communication network, the MAC protocol is one of the most essential components if the transmission media has the broadcast type. Typical examples are wireless networks, hybrid fiber-coax (HFC) cable television networks, Ethernet and so on. Via the device with MAC protocol, the users can access the computer network and share the resource of it.

Please refer to FIG. 1, which is a general architecture of the conventional computer network employing MAC protocols. It includes multiple MAC nodes 1' and a physical multi-access medium 2'. The MAC nodes 1' can communicate with each other via the physical multi-access medium 2'. In practice, the multiple MAC nodes 1' can be an apparatus equipped with network accessing device. And, the physical multi-access medium 2' can be a wireless access channel, Ethernet or HFC network.

Please refer to FIG. 2, which shows the internal structure of the MAC nodes 1'. Each of the MAC nodes 1' includes a MAC processor 11', a transmitter/receiver circuit 12' and a packet buffer 13'. Therein, the MAC processor 11' can transmit/receive data packets to/from the physical multi-access medium 2' by employing the transmitter/receiver circuit 12'. And, the packet buffer 13' is used to store the packets from the upper layer, i.e. data link layer, or the packet received from the physical multi-access medium 2'.

However, numerous protocols have been designed for different network architectures and/or under different criteria. Therefore, there are various apparatuses for different protocols being designed. Whereas, a specific MAC apparatus only can be used for a specific MAC protocol or multi-access medium 2', e.g. the MAC apparatus designed for Ethernet environment cannot be used in wireless local area networks (wireless LANs).

Therefore, if a user want to access the computer network via different multi-access mediums 2', he needs to buy multiple MAC apparatuses. It is uneconomic and inconvenient for the user.

Accordingly, as discussed above, the conventional MAC apparatus obviously still has some drawbacks that could be improved. The present invention aims to resolve the drawbacks in the prior art.

SUMMARY OF THE INVENTION

An objective of the present invention is to provide an apparatus and method for unifying MAC protocols so that various existed MAC protocols, e.g. slotted ALOHA protocol, carrier sense multiple access (CSMA) protocol, group randomly addressed polling (GRAP) protocol and so forth, can be unified.

Another objective of present invention is to provide a software-defined MAC apparatus that is controlled by a unified MAC program to operate as various protocols according to different parameter settings. Thus, the user can switch to various MAC protocols by using different parameter settings so as to roam among different systems with the same MAC apparatus.

Still another objective of the present invention is to provide a MAC apparatus that can achieve the enhancements or evolutions of protocol standards by software upgrade without hardware re-design.

In order to reach the objectives described above, the present invention provides a method and apparatus for unifying MAC protocols. The method comprises the following steps:

grouping the MAC nodes having ready packets according to preset parameters so as to produce a grouping result; and transmitting packets over a physical multi-access medium according to the grouping result and the preset parameters.

The apparatus comprises a unified MAC processor, a memory and a transmitter/receiver circuit. Therein, the memory further comprises a unified MAC program, which is designed complied with the method described above, and a packet buffer. Moreover, the unified MAC program is used to control the operation of the unified MAC processor.

After configuring the unified MAC program by a specific parameters setting, the unified MAC processor will operate as a specific MAC protocol, e.g. slotted ALOHA protocol, CSMA protocol or GRAP protocol, corresponding to the specific parameters setting. Therefore, the apparatus can transmit its packet via the transmitter/receiver circuit thereon to the physical multi-access medium in accordance with the specific MAC protocol.

Numerous additional features, benefits and details of the methods and apparatus of the present invention are described in the detailed description, which follows.

BRIEF DESCRIPTION OF THE DRAWINGS

FIG. 6-1~2: are detailed operation flowcharts of the method for unifying MAC protocols complied with the present invention.

FIG. 7-1~3: illustrate three different access schemes, i.e. 2-way handshaking, 4-way handshaking or polling, respectively.

Table 1: illustrates the parameter configurations for different MAC protocols.

DETAILED DESCRIPTION

Figure 3:
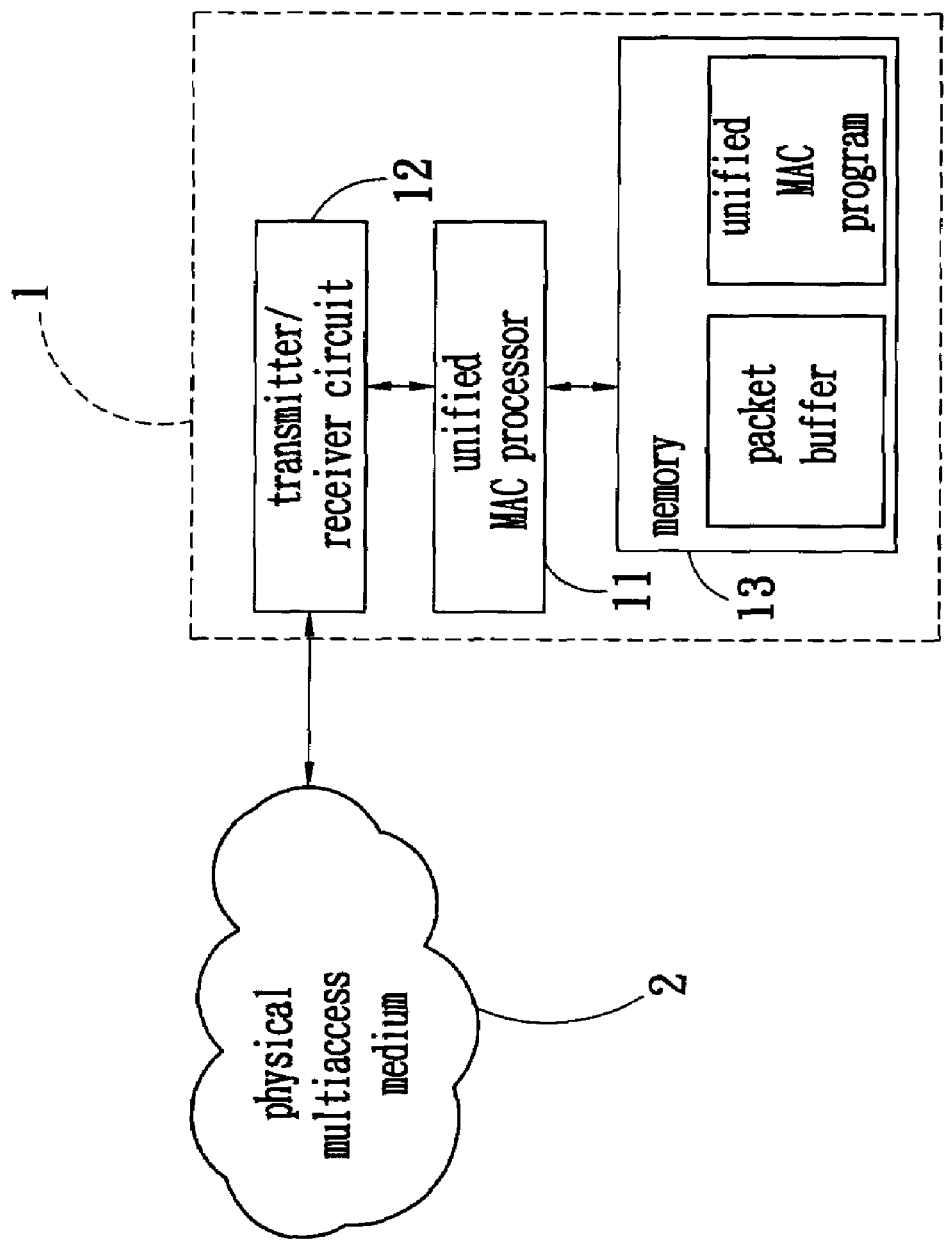
FIG. 3: is an internal structure of the unified MAC node complied with the present invention.

Please refer to FIG. 3, which is an internal structure of the unified MAC node 1 complied with the present invention. The unified MAC node 1 comprises a unified MAC processor 11, transmitter/receiver circuit 12 and a memory 13. Therein, the memory 13 further comprises a unified MAC program 131 and a packet buffer 132.

The unified MAC program 131 stored in the memory 13 controls the operation of the unified MAC processor 11. Then, under the control of the unified MAC program 131, the unified MAC processor 11 would transit or receive data packet to or from a physical multi-access medium 2 via the transmitter/receiver circuit 12. And, the data packet from the upper layer, i.e. data link layer, or the packet received form the physical multi-access medium 2 can be stored in the packet buffer 132 of the memory 13.

Therein, the unified MAC program 131 can be configured to operate as different protocols by different parameter settings. Thus, the user can switch to different MAC protocols by different parameter configuration so as to roam among different systems with the same MAC apparatus.

In this embodiment, the unified MAC program 131 can be configured to operate as following protocols: ALOHA protocol with geometric backoff, binary exponential and Q-ary collision resolution algorithm, p-persistent carrier sense multiple access (CSMA) protocol, carrier sense multiple access/collision avoidance (CSMA/CA) protocol, carrier sense multiple access/collision detection (CSMA/CD) protocol and group randomly addressed polling (GRAP) protocol. However, the present invention is not limited within these protocols.

Moreover, in practice, the physical multi-access medium 2 can be, e.g. a wireless access channel, Ethernet or HFC network.

Before disclosing the method for unifying MAC protocols, the common cycling style of general MAC protocols should be discussed in advance. Take the slotted ALOHA for example. A node with ready packets in the ALOHA system can transmit freely at slot boundaries. When collision occurs, each involved node randomly chooses a time interval to "backoff" according to some specific rules, e.g. random backoff, geometric random backoff or binary exponential backoff. After the chosen time interval passes by, the node will retransmit the collided packet. If still collided, the node will repeat the steps described above until successfully transmitting the packet.

Figure 4:
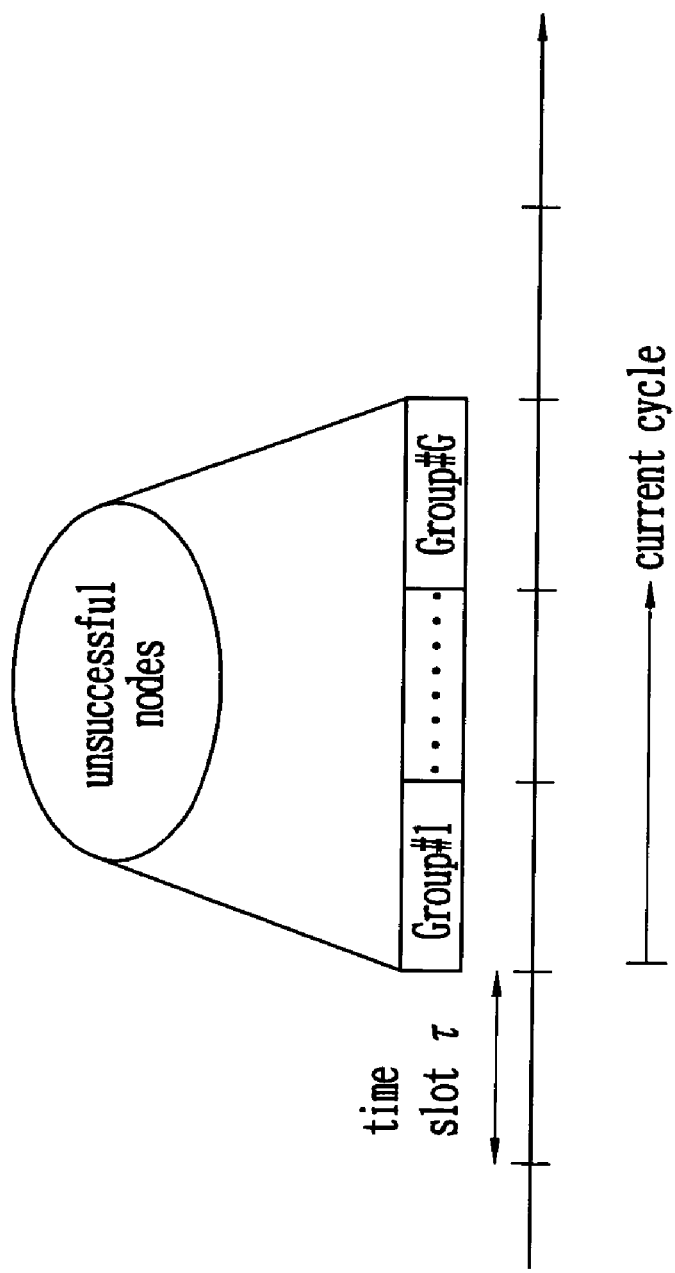
FIG. 4: shows a typical operation of slotted ALOHA protocol.

FIG. 4 shows a typical operation of slotted ALOHA. If collision occurs in time slot τ, each of the involved nodes, i.e. unsuccessful nodes, has to choose a number of slots to backoff according to the backoff rule and retransmit when the backoff timer expires. It means that if collision occurs in the ALOHA system, it will start a cycle and the unsuccessful nodes would be split into several groups, e.g. group #1 to group #G, in this cycle so as to transmit in different time slots. And, if collided again, it will invocate a new cycle.

Figure 5:
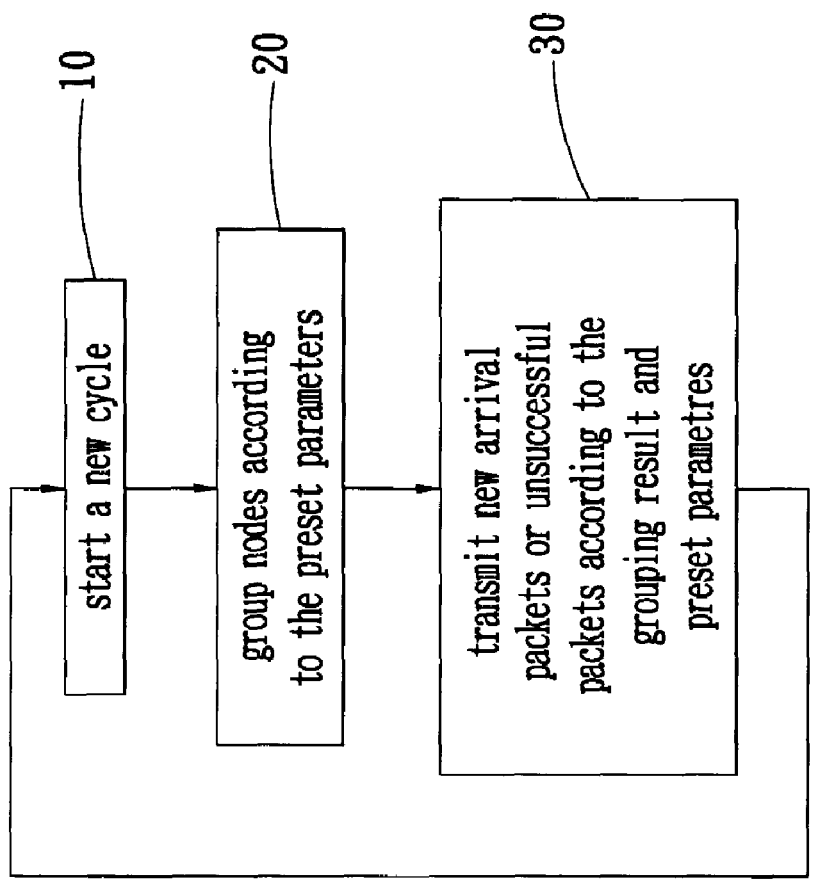
FIG. 5: is an operation flowchart of the method for unifying MAC protocols complied with the present invention.

Due to this cycling feature, various MAC protocols can be unified. FIG. 5 is the operation flowchart of the method for unifying MAC protocols complied with the present invention. Each unified MAC node 1 connected with the physical multi-access medium 2 would operate complied with this method. The steps of the method is described as following:

Step 10: Initially, a new cycle is started.

Step 20: Then, the nodes having a ready packet will be grouped according to the preset parameters so as to split the nodes into different groups. The nodes include the unsuccessful nodes, which refer to the nodes didn't transmit their data packets successfully in the last cycle, and the nodes having a new arrival packet.

Step 30: After being grouped, every node having a new arrival packet or unsuccessful packet will transmit its packet according the grouping result and preset parameters. And, jump back to step 10.

Figure 1:
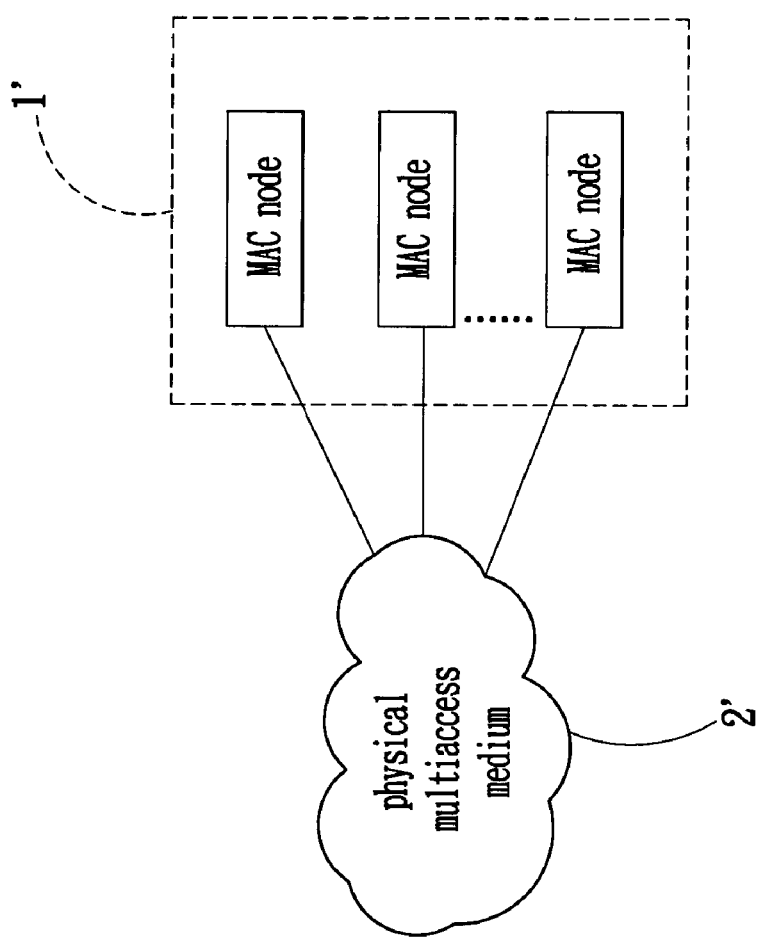
FIG. 1: is a general architecture of the conventional computer network employing MAC protocols.
Figures 1, 6:
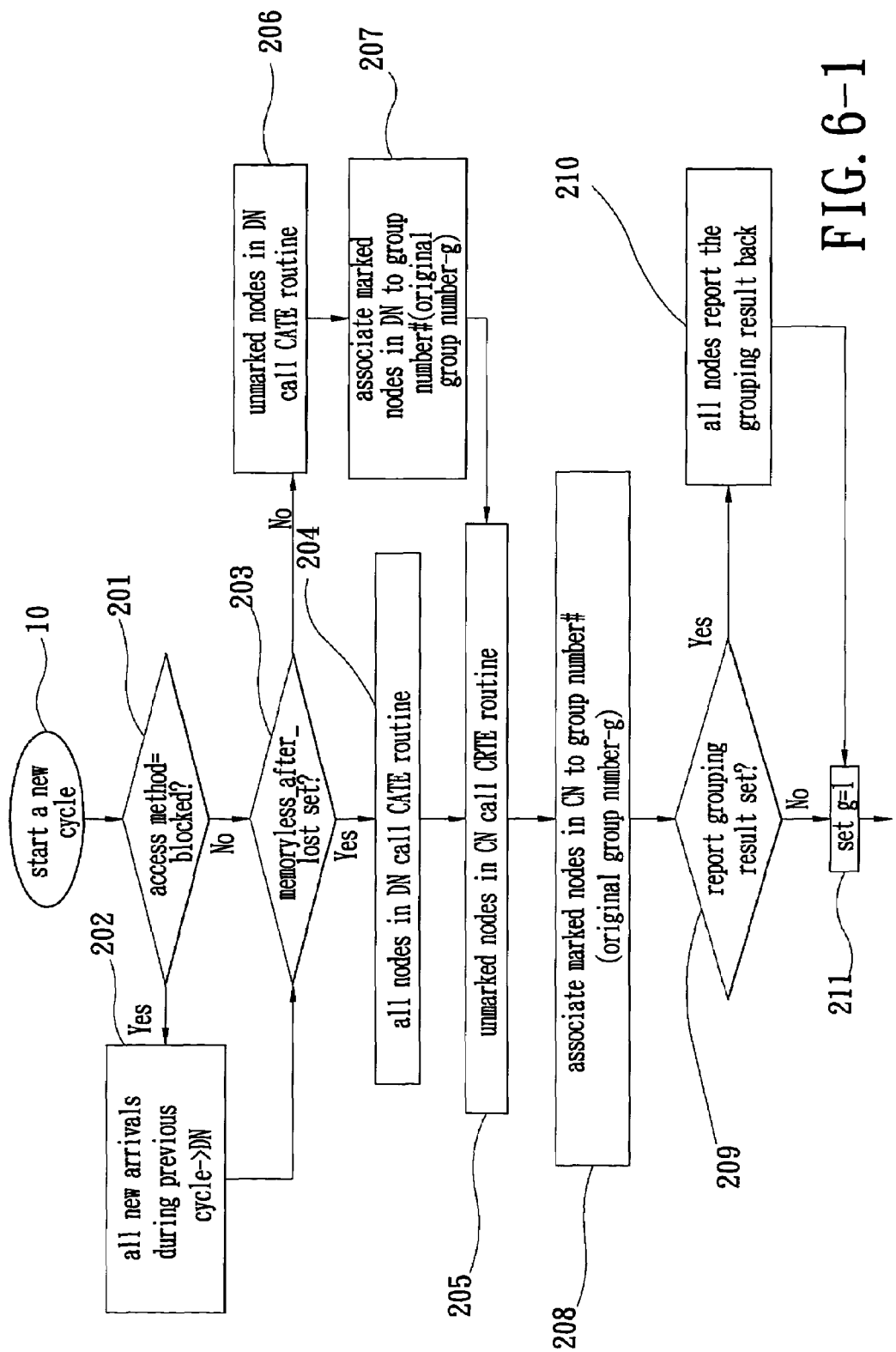
Figures 2, 6:
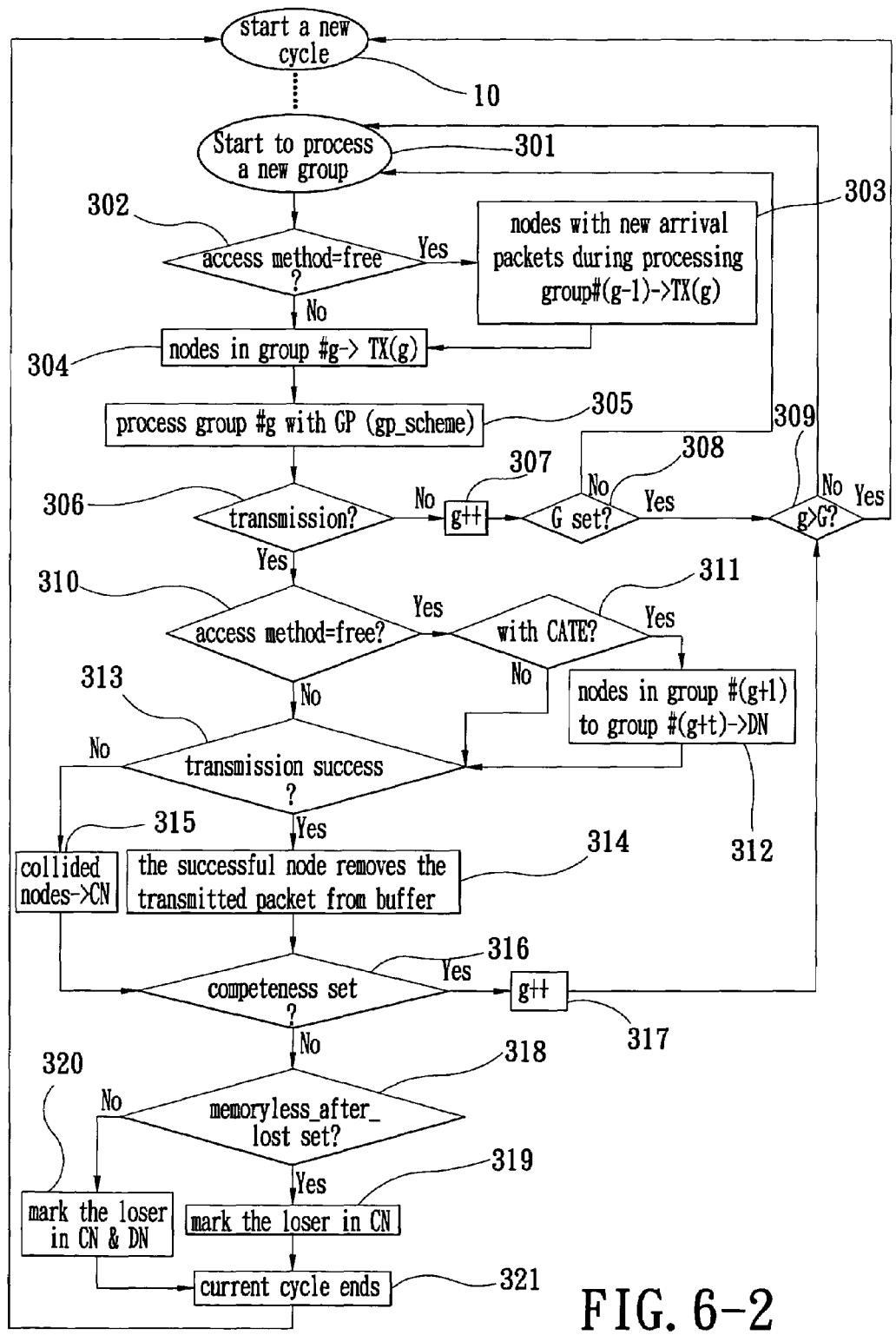

Please refer to FIG. 6-1, which further details the method for unifying MAC protocols. Accordingly, the step 20 comprises following steps:

Step 201: First, each node, under the control of the unified MAC program 131, will determine the access method of the MAC protocol according to the preset parameters. If the parameter of access method is "blocked", it means that the determined MAC protocol has the operating algorithm with contention, e.g. GRAP protocol, and then step 202 should be jumped to. Otherwise, the parameter of access method will be "free", it means that the determined MAC protocol has the operating algorithm without contention, e.g. ALOHA or CSMA protocol, and then step 203 should be jumped to.

Step 202: In this step, all new arrivals, i.e. the nodes got a ready packet from the upper layer, during previous cycle will be designated as deferred nodes (DN), which refer to the nodes that didn't transmit their packets in the previous cycles successfully due to sensing a busy channel. Then, jump to step 203.

Step 203: In this step, each node in DN will determine if it will memorize the previous group number according to the parameter of memoryless_after_lost. If the parameter of memoryless_after_lost is set positively, then jump to step 204. Otherwise, jump to step 206.

Step 204: Since the nodes in DN decided not to memorize the original group number, all nodes in DN will call a collision anticipation tree expansion (CATE) routine to split the nodes in DN into different groups so as to avoid the collisions.

In this embodiment, the CATE routine can be determined as a geometric_CATE, BEB_CATE or uniform_CATE according to the preset parameters. Therein, the geometric_CATE and BEB_CATE use the geometric backoff and binary exponential backoff (BEB) algorithms to group the nodes, respectively. And, the uniform CATE can use the algorithm selected from, e.g. geometric random backoff algorithm, BEB algorithm.

Step 205: Then, the nodes collided with other nodes in the last cycle, called unmarked collided nodes (CN), will call a collision resolution tree expansion (CRTE) routine to split the nodes designated as unmarked CN into different groups so as to resolve the collisions.

In this embodiment, the CRTE routine can be determined as a geometric_CRTE, BEB_CATE, Q-aryCRA_CRTE or uniform_CRTE according to the preset parameters. Therein, the geometric_CRTE, BEB_CATE and Q-aryCRA_CRTE use the geometric backoff, binary exponential backoff (BEB) and Q-ary collision resolution algorithms to group the nodes, respectively. And, the uniform CRTE can use the algorithm selected from, e.g. geometric random backoff algorithm, BEB algorithm or Q-ary collision resolution algorithm.

Step 206: Since the nodes in DN decided to memorize the original group number, the unmarked nodes in DN, i.e. the nodes didn't transmit in the last cycle because of sensing a busy channel, will call the CATE routine to split the nodes in DN into different groups.

Step 207: Then, the marked nodes in DN, i.e. the nodes designated as DN failed to transmit their packet in the previous cycle because their backoff intervals are not the shortest one, each will be promoted to a group that is g-level higher than the original group. Therefore, the marked nodes in DN will be associated to group number #(original group number−g).

Step 208: In this step, the marked nodes in CN, i.e. the nodes designated as CN failed transmit their packet in the previous cycle because their backoff intervals are not the shortest one, each will be promoted to a group that is g-level higher than the original group. Therefore, the marked nodes in CN will be associated to group number #(original group number−g).

Step 209: In this step, each node will determine if it will report the grouping result according the preset parameters to a control center. If positive, then go to step 210. Otherwise, go to step 211.

Step 210: Since the nodes determined to report the grouping result, all nodes in this step will report the grouping result back the control center. Then, go to step 211.

Step 211: Set variable g equal to 1, i.e. g=1. Therefore, the marked nodes in DN or CN each will be associated to group number #(original group number−1).

Figure 2:
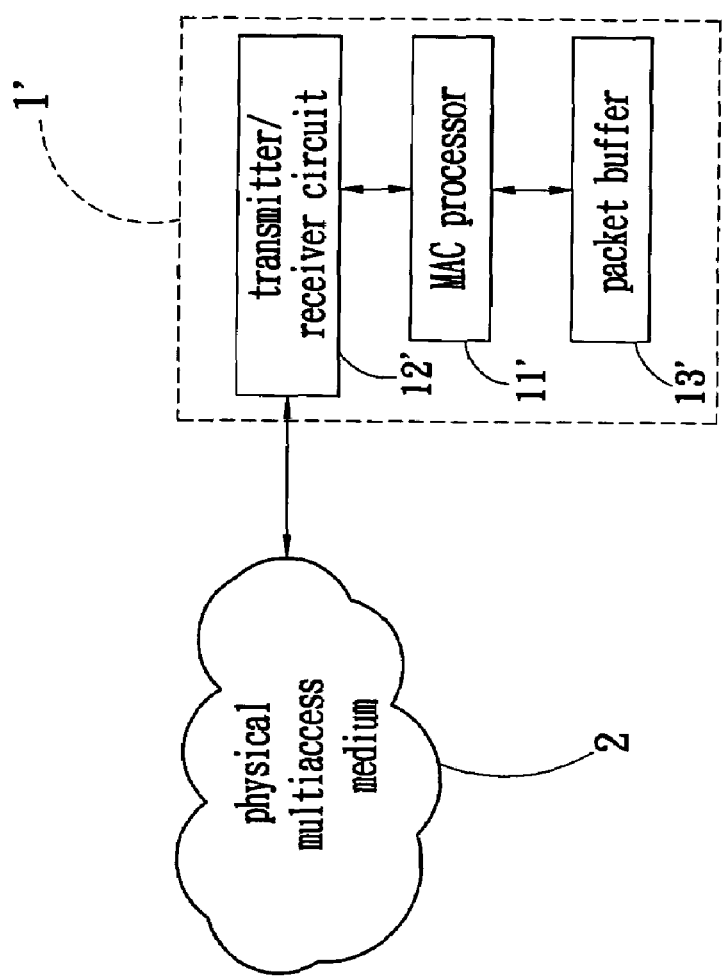
FIG. 2: is an internal structure of the conventional MAC node.

Moreover, pleaser refer to FIG. 6-2. The step 30 also further comprises following steps:

Step 301: In this step, according to the method for unifying MAC protocols complied with the present invention, each node will be ready to transmit its packet in accordance with the grouping result. And, the processing of a new group will be started. Then, go to step 302.

Step 302: First, each node, under the control of the unified MAC program 131, will check the access method of the MAC protocol according to the preset parameters. If the preset parameter of access method is "free", then go to step 303. Otherwise, go to step 302.

Step 303: Since the set parameter of access method is "free", meaning that the determined MAC protocol has the operating algorithm without contention, e.g. ALOHA or CSMA protocol, the nodes with new arrival packet during processing group #(g−1) will be designated to TX(g), which refers to nodes being processed via the gth channel. It means that the nodes with new arrival packet during processing group #(g−1) are included in group #g and will be processed via the gth channel unconditionally. Then go to step 304.

Step 304: Then, every node in group #g will be designated to TX(g). Then, go to step 305.

Step 305: In this step, the nodes in group #g will execute the group processing scheme, i.e. the routine of GP (gp_scheme). Then, go to step 306.

In this embodiment, there are three different group process schemes, i.e. 2-way handshaking, 4-way handshaking or polling and the nodes will execute one of them according the preset parameters.

Figures 3, 7:
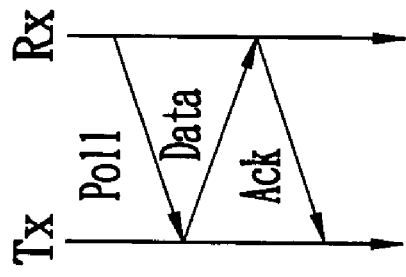
Figures 2, 7:
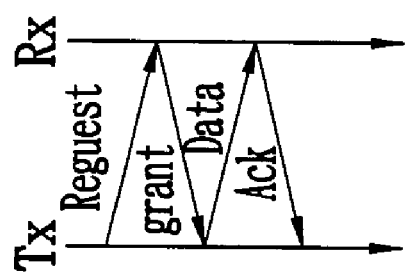
Figures 1, 7:
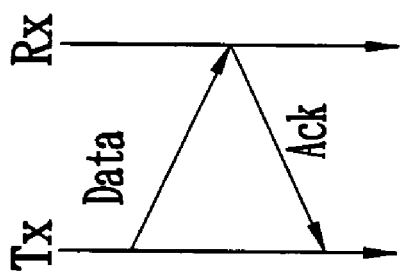

Please refer to FIG. 7-1~3, which illustrate these three different schemes, respectively. The vertical direction refers to time and the horizontal direction refers to space.

First, please refer to FIG. 7-1, which illustrates the scheme of 2-way handshaking. This scheme includes two steps. In the first step, the transmitter (TX) will directly transmit the data packet to the receiver (RX) at the beginning. Then, in the last step, after the data packet is received successfully, the RX will send an acknowledgement (ACK) signal back to TX so as to finish the 2-way handshaking scheme.

Then, please refer to FIG. 7-2, which illustrates the scheme of 4-way handshaking. This scheme includes four steps. In the first step, the TX will send out a request signal to inform the RX that the TX has a data packet ready to transmit. In the second step, after the request signal is received successfully, the RX will send a grant signal to inform the TX that the RX is ready to receive the data packet. Then, in the third step, after the grant signal is received, the TX will send the data packet to the RX. Finally, in the last step, after the data packet is received, the RX will send an ACK back to TX so as to finish the 4-way handshaking scheme.

Lastly, please refer to FIG. 7-3, which illustrates the scheme of polling. This scheme includes three steps. In the first step, the RX will send a polling signal (poll) to a TX having a ready packet. Then, in the second step, the TX that received the polling signal will send the data packet to the RX. Finally, in the last step, the RX will send an ACK back to TX so as to finish the polling scheme.

Step 306: If no packet is transmitted during processing group #g, then go to step 307. Otherwise, go to step 310.

Step 307: In this step, the variable g will plus 1, i.e. g++. Then, go to step 308.

Step 308: Then, if the value of variable G, referring to the maximum tree expansion size or the upper limitation of variable g, is set, then go to step 309. Otherwise, go back to step 301 for processing next group.

Step 309: Then, if the value of g is larger than that of G, then go back to step 10 to start another cycle. Otherwise, go back to step 301 for processing next group.

Step 310: In this step, each node will check the parameter of access method. If it is "free", then go to step 311. Otherwise, go to step 313.

Step 311: Then, the nodes will check whether the routine of CATE is applied according to the preset parameters. If the nodes operate with the routine of CATE, then go to step 312. Otherwise, go to step 313. In this embodiment, if the nodes operate with the routine of CATE, it means that the nodes can get the channel information.

Step 312: Since the algorithm of CSMA protocol is applied, the nodes in group #(g+1) to group #(g+t) will sense a busy channel so that these nodes will be designated as DN, wherein the variable t refers to the duration for transmission. Then, go to step 313.

Step 313: Since at least a packet is transmitted during processing group #g, in this step, the nodes will check if the transmission is successful or not. If positive, it means there is only one packet being transmitted. Then, go to step 314. Otherwise, it means collision occurs. Then, go to step 315.

Step 314: The node transmitting successfully, i.e. the successful node, will remove the transmitted packet from its buffer. Then, go to step 316.

Step 315: Since collision occurs, the collided nodes will be designated as CN. Then, go to step 316.

Step 316: In this step, each node will check if the parameter of completeness is set according to the preset parameters. If positive, it means the algorithm of GRAP is applied and therefore this cycle will end after all groups are processed. Then, go back to step 317. Otherwise, go to step 318.

Step 317: In this step, the variable g will plus with 1, i.e. g++. Then, go to step 309.

Step 318: In this step, each node in DN will determine if it will memorize the group number according to the parameter of memoryless_after_lost. If the parameter is set positively, then jump to step 319. Otherwise, jump to step 320.

Step 319: The nodes in CN fail to transmit in this cycle, i.e. the loser in CN, will be marked. Then, go to step 321.

Step 320: The nodes in CN and DN fail to transmit in this cycle, i.e. the loser in CN and DN, will be marked. Then, go to step 321.

Step 321: Finally, the current cycle is ended. And, step 10 should be jump to so as to start another cycle.

Please refer to Table 1, which illustrates the parameter configurations for different MAC protocols. There are five different MAC protocols listed in Table 1 and the unified MAC node 1 can be configured to operate as one of them by using a corresponding parameter configuration.

For example, if the user would like to make the unified MAC node 1 operate as ALOHA protocol with geometric backoff, the unified MAC node 1 should be configured according to the corresponding parameters, i.e. slot time=one transmission+one feedback, access method=free, completeness=no, memoryless after lost=no, report grouping result=no, group process scheme=2-way handshaking, type of CATE=none and type of CRTE=geometric_CRTE.

Figure 8:
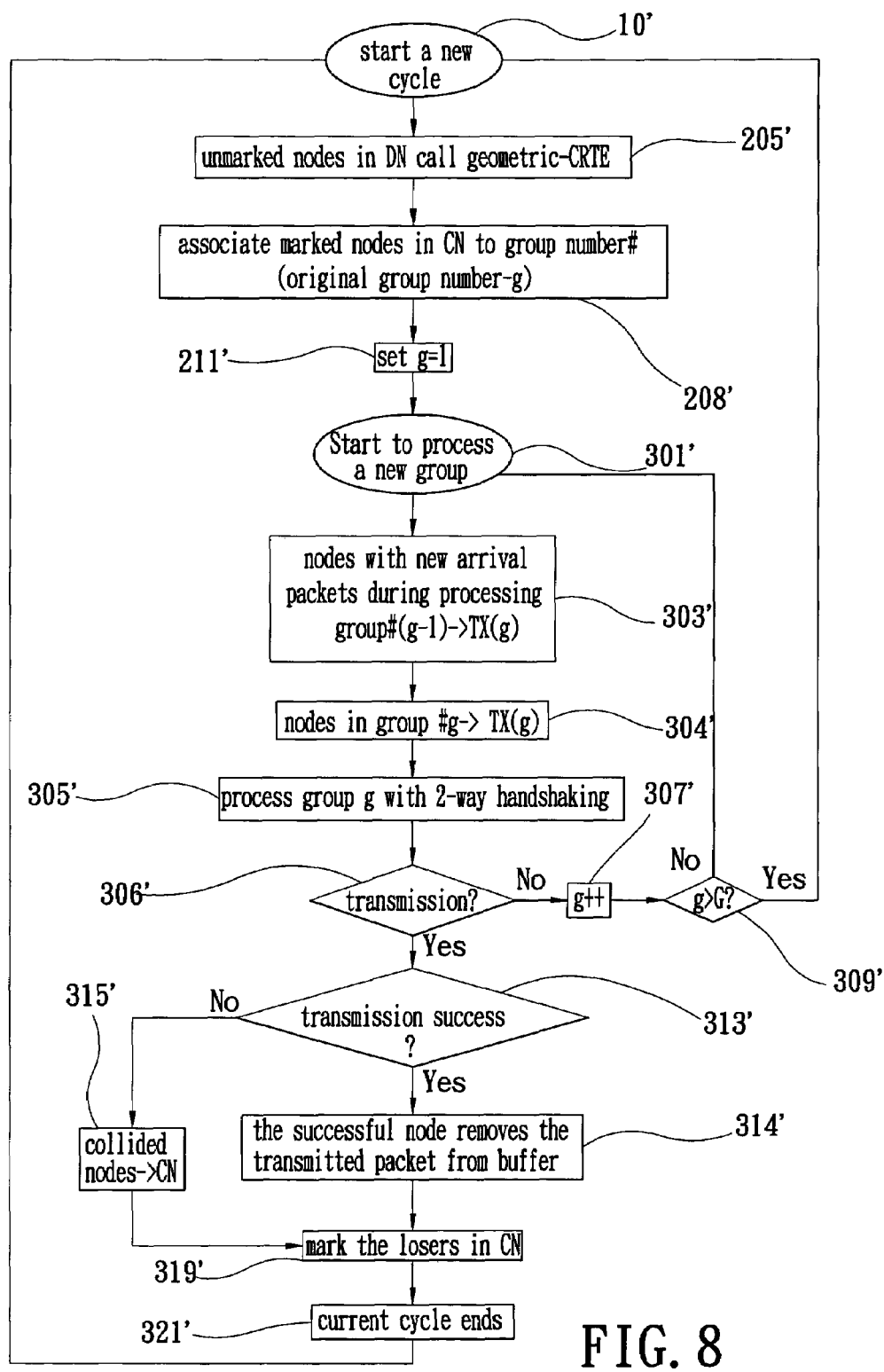
FIG. 8: is an operation flowchart of the unified MAC node 1 configured by the parameters corresponding to ALOHA protocol having geometric backoff.

Please refer to FIG. 8, which is the operation flowchart of the unified MAC node 1 configured by the corresponding parameters of ALOHA protocol with geometric backoff. Due to the preset parameters, some steps shown in FIG. 6 have been omitted in FIG. 8. The steps of the operation are described as following:

Step 10': Initially, a new cycle is started.

Step 205': Then, the routine of geometric_CRTE will be executed to split the unmarked nodes in CN nodes into different groups so as to resolve the collisions.

Step 208': In this step, the marked nodes in CN each will be promoted to a group that is g-level higher than the original group. Therefore, the marked nodes in CN will be associated to group number #(original group number−g).

Step 211': Set variable g equal to 1, i.e. g=1. Therefore, the marked nodes in CN each will be associated to group number #(original group number−1).

Step 301': In this step, each node will be ready to transmit its packet in accordance with the grouping result. And, the processing of a new group will be started.

Step 303': The nodes with new arrival packet during processing group #(g−1) will start the process of transmitting the new arrival packet, i.e. start the routine of TX(g).

Step 304': Every node in group #g will start the routine of TX(g).

Step 305': The nodes in group #g will perform 2-way handshaking.

Step 306': If no packet is transmitted during processing group #g, then go to step 307'. Otherwise, go to step 313'.

Step 307': The variable g will plus with 1, i.e. g++.

Step 309': If the value of g is larger than that of G, then go back to step 10' to start another cycle. Otherwise, go back to step 301' for processing next group.

Step 313': In this step, the nodes will check if the transmission is successful or not. If positive, go to step 314'. Otherwise, go to step 315'.

Step 314': The successful node will remove the transmitted packet from its buffer.

Step 315': The collided nodes will be designated as CN.

Step 319': The loser in CN will be marked.

Step 321': Finally, the current cycle is ended. Then, step 10 should be jump to for starting another cycle.

One can easily verify that the steps described above are the same as the operational steps of the conventional ALOHA protocol with geometric backoff. Hence, in accordance with the present invention, the unified MAC node 1 can be configured to operate as the conventional ALOHA protocol with geometric backoff by setting the parameters. Further, by the same method, the unified MAC node 1 can also be configured to operate as other protocols, e.g. the protocols listed in Table 1.

Figure 9:
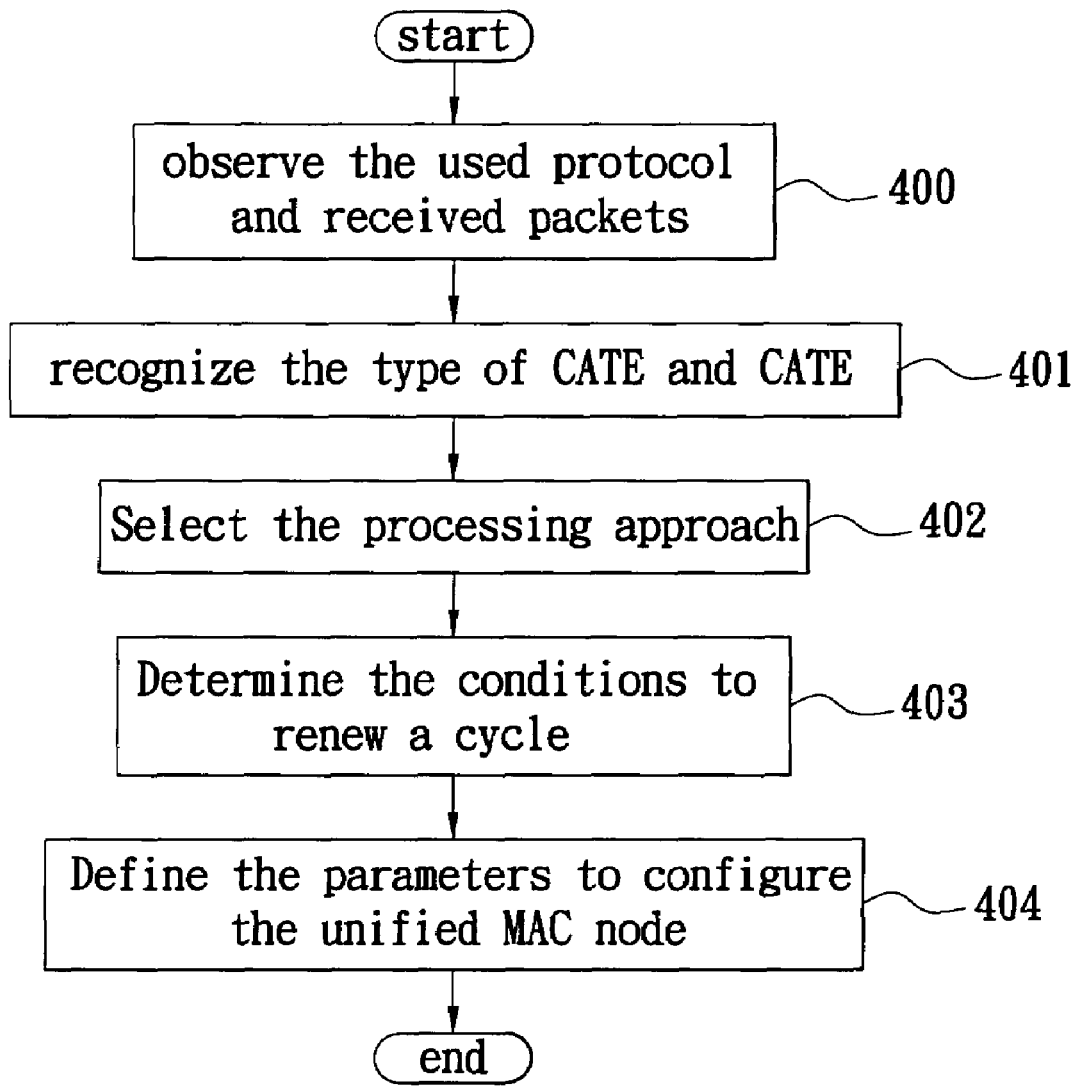
FIG. 9: is a flowchart of parameter setting for unified MAC nodes complied with the present invention.

Please refer to FIG. 9, which is a flowchart of parameter setting for unified MAC nodes complied with the present invention. In accordance with the description above, one can realize that the parameter setting of the unified MAC nodes can generally include following steps:

Step 400: Observe the protocol used between the MAC nodes and the formats of packets received from the physical multi-access medium. For example, observe how contending and collided MAC nodes are separated in order to avoid and resolve collision.

Step 401: Recognize the type of CATE and CRTE of the protocol used between the MAC nodes by using the observed results. For example, identify the probability distribution used for splitting nodes.

Step 402: Select the approach by using the observed results for processing each group, such as 2-way or 4-way handshaking, polling, and so forth.

Step 403: Determine the conditions to renew a cycle by using the observed results. A cycle may renew whenever there is a transmission occurs, or whenever all groups are processed (the "completeness" parameter that determines when a cycle renews).

Step 404: Define the parameters by using the observed results to configure the unified MAC nodes. For instance, define the "access method" to decide whether new arrivals are permitted to access the channel in current cycle or the "memoryless after lost" to say whether or not the un-transmitted nodes remember their associated group number in previous cycles.

According to the description above, it is proved that the present invention can provide an apparatus and method for unifying MAC protocols so that various existed MAC protocols, e.g. slotted ALOHA protocol, carrier sense multiple access (CSMA) protocol, group randomly addressed polling (GRAP) protocol and so forth, can be unified.

Furthermore, in accordance with the present invention, the MAC nodes in different groups can send their packets via different channels so as to avoid or resolve collisions. The channel can be a time slot in a time division multiple access (TDMA) system, a carrier frequency in a frequency division multiple access (FDMA) system, a code channel in a code division multiple access (CDMA) system, or an antenna when antenna diversity is employed.

Moreover, the present invention also can provide a software-defined MAC apparatus, which has a unified MAC program that can be configured to operate as different protocols by different parameter settings. Thus, the user can switch to different MAC protocols by different parameter configuration so as to roam among different systems with the same MAC apparatus.

Besides, the MAC apparatus complied with the present invention also can achieve the enhancements or evolutions of protocol standards by upgrading the software. Therefore, the hardware will not need to redesign and the cost will be reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

TABLE 1

| | ALOHA with geometric or binary exponential backoff | Basic Q-ary CRA | P-persistent CSMA | CSMA/CA | GRAP |
|---|---|---|---|---|---|
| slot time | one transmission one feedback | one transmission one feedback | one propagation delay | defined in specification | one propagation delay |
| access method | free | free | free | free | blocked |
| completness | no | no | no | no | yes |
| memoryless after lost | no | yes | no | yes | no |
| report grouping result | no | no | no | no | yes |
| group process scheme | 2-way handshaking | 2-way handshaking | 2-way handshaking | 4-way handshaking | polling |
| type of CATE | none | none | geomeric_CATE | BEB_CATE | uniform_CATE |
| type of CRTE | geomeric_CRTE or BEB_CRTE | Q-ary CRA_CRTE | none | BEB_CRTE | uniform_CRTE |

What is claimed is:

1. A method for unifying medium access control (MAC) protocols comprising:

grouping MAC nodes having ready packets according to preset parameters to produce a grouping result; and transmitting packets of the MAC nodes, including unsuccessful packets from unsuccessful MAC nodes or new arrival packets from other MAC nodes, over a physical multi-access medium according to the grouping result and the preset parameters, wherein the preset parameters comprise slot time, access method, and group process scheme.

2. The method as claimed in claim 1, wherein the preset parameters further comprise, completeness, memoryless after lost, report grouping result, type of collision anticipation tree expansion (CATE) and type of collision resolution tree expansion (CRTE).

3. The method as claimed in claim 2, wherein the step of grouping the MAC nodes further comprises:

designating nodes having new arrival packets during previous cycle as deferred nodes (DN) when the parameter "access method" is "blocked".

4. The method as claimed in claim 3, wherein, when the parameter "memoryless after lost" is positive, the step of grouping the MAC nodes further comprises:

calling a CATE routine to split nodes in DN into different groups;

calling a CRTE routine to split unmarked nodes in collided nodes (CN) into different groups; and associating marked nodes in CN to group numbers that are g-level higher than their previous group numbers.

5. The method as claimed in claim 3, wherein, when the parameter "memoryless after lost" is negative, the step of grouping the MAC nodes further comprises:

calling a CATE routine to split unmarked nodes in DN into different groups;

associating marked nodes in DN to group numbers that are g-level higher than their previous group;

calling a CRTE routine to split unmarked nodes in collided nodes (CN) into different groups; and associating marked nodes in CN to group numbers that are g-level higher than their previous group numbers.

6. The method as claimed in claim 4 or 5, wherein the step of grouping the MAC nodes further comprises:

reporting the grouping results to a control center when the parameter "report grouping result" is positive.

7. The method as claimed in claim 2, wherein the step of transmitting the packets of the MAC nodes further comprises:

designating nodes with new arrival packets during processing group #(g−1) to a TX(g) when the parameter "access method" is "free" ; and designating nodes in group #g to the TX(g);

wherein the TX(g) refers to nodes being processed via a gth channel.

8. The method as claimed in claim 7, wherein the channel is a time slot in a time division multiple access (TDMA) system, a carrier frequency in a frequency division multiple access (FDMA) system, a code channel in a code division multiple access (CDMA) system, or an antenna when antenna diversity is employed.

9. The method as claimed in claim 7, wherein the step of transmitting the packets of the MAC nodes further comprises:

executing a group processing (GP) routine to process the nodes in a group #(g) according to the parameter "group processing scheme";

wherein the GP routine refers to a routine of transmitting ready packets of the nodes in the group #(g).

10. The method as claimed in claim 9, wherein the GP routine is a 2-way handshaking, 4-way handshaking or polling scheme.

11. The method as claimed in claim 9, wherein the step of transmitting the packets of the MAC nodes further comprises:

processing a group #(g+1) when there is no packet being transmitted and g+1 isn't larger than a preset value G.

12. The method as claimed in claim 9, wherein the step of transmitting the packets of the MAC nodes further comprises:

starting a new cycle when there is no packet being transmitted and g+1 is larger than a preset value G.

13. The method as claimed in claim 9, wherein the step of transmitting the packets of the MAC nodes further comprises:

designating nodes in a group #(g+1) to group #(g+t) as DN when a packet is transmitted, the parameter "access method" is "free" and a CATE routine is applied;

wherein the variable t refers to a packet transmitting duration.

14. The method as claimed in claim 9 or 13, wherein the step of transmitting the packets of the MAC nodes further comprises:

removing a successfully transmitted packet from a buffer of a successful node when the transmission is successful.

15. The method as claimed in claim 9 or 13, wherein the step of transmitting the packets of the MAC nodes comprises:

designating collided nodes as CN when the transmission is not successful.

16. The method as claimed in claim 14, wherein the step of transmitting the packets of the MAC nodes further comprises:

marking losers in CN when the parameter "completeness" is negative and "memoryless after lost" is positive;

wherein the losers in CN refer to nodes in CN that fail to transmit.

17. The method as claimed in claim 14, wherein the step of transmitting the packets of the MAC nodes comprises:

marking losers in CN or DN when the parameter "completeness" and "memoryless after lost" are both negative;

wherein the losers in CN or DN refer to nodes in CN or DN that fail to transmit.

18. The method as claimed in claim 15, wherein the step of transmitting the packets of the MAC nodes further comprises:

marking losers in CN when the parameter "completeness" is negative and "memoryless after lost" is positive;

wherein the losers in CN refer to nodes in CN that fail to transmit.

19. The method as claimed in claim 15, wherein the step of transmitting the packets of the MAC nodes comprises:

marking losers in CN or DN when the parameter "completeness" and "memoryless after lost" are both negative;

wherein the losers in CN or DN refer to nodes in CN or DN that fail to transmit.

20. An apparatus for unifying MAC protocols comprising:

a unified MAC processor;

a memory having a unified MAC program; and a transmitter/receiver circuit;

wherein the unified MAC program is used to control the operation of the unified MAC processor and the unified MAC processor operates as a specific MAC protocol after the unified MAC program is configured by a specific set of parameters; thereby, the apparatus transmitting its packet via the transmitter/receiver circuit thereon in accordance with the configured MAC protocol, wherein the parameters comprise slot time, access method, and group process scheme.

21. The apparatus claimed in the claim 20, wherein the parameters further comprise completeness, memoryless after lost, report grouping result, type of collision anticipation tree expansion (CATE) and type of collision resolution tree expansion (CRTE).

22. The apparatus claimed in the claim 20, wherein the unified MAC program comprises a CATE routine for splitting nodes in DN into different groups so as to avoid collisions.

23. The apparatus claimed in the claim 20, wherein the unified MAC program comprises a CRTE routine for splitting nodes in CN into different groups so as to resolve collisions.

24. The apparatus claimed in the claim 20, wherein the memory further has a packet buffer for saving new arrival packets from upper layer protocol or packets received from physical layer.

25. A method for setting parameters of a unified MAC node, comprising:

observing a protocol used between MAC nodes and formats of packets received from a physical multi-access medium;

recognizing a type of collision anticipation tree expansion (CATE) or collision resolution tree expansion (CRTE) of the protocol used between the MAC nodes by using observed results;

selecting a group processing approach by using the observed results;

determining conditions to renew a cycle by using the observed results; and defining the parameters by using the observed results to configure the unified MAC node.

26. The method as claimed in claim 25, wherein the group processing approach is 2-way handshaking, 4-way handshaking or polling.

27. The method as claimed in claim 25, wherein the parameters comprise slot time, access method, completeness, memoryless after lost, report grouping result, group process scheme, CATE and CRTE.

* * * * *